(12) United States Patent
Wenzel

(10) Patent No.: US 8,215,841 B2
(45) Date of Patent: Jul. 10, 2012

(54) BEARING ASSEMBLY FOR USE IN EARTH DRILLING

(76) Inventor: Kenneth H. Wenzel, Edmonton (CA)

( * ) Notice: Subject to any disclaimer, the term of this patent is extended or adjusted under 35 U.S.C. 154(b) by 306 days.

(21) Appl. No.: 12/651,573

(22) Filed: Jan. 4, 2010

(65) Prior Publication Data

US 2010/0215301 A1    Aug. 26, 2010

(51) Int. Cl.
  *F16C 3/00* (2006.01)
  *E21B 4/02* (2006.01)
  *F16C 32/06* (2006.01)

(52) U.S. Cl. ............ 384/97; 384/95; 384/121; 384/123; 175/107

(58) Field of Classification Search ............. 384/95–97, 384/123, 304, 452–455, 121; 175/107, 195
See application file for complete search history.

(56) References Cited

U.S. PATENT DOCUMENTS

| | | | | | |
|---|---|---|---|---|---|
| 3,934,956 | A | * | 1/1976 | Pitner | 384/455 |
| 4,560,014 | A | * | 12/1985 | Geczy | 384/123 |
| 5,037,212 | A | * | 8/1991 | Justman et al. | 384/95 |
| 5,248,204 | A | * | 9/1993 | Livingston et al. | 384/97 |
| 5,364,192 | A | * | 11/1994 | Damm et al. | 384/420 |
| 5,368,398 | A | * | 11/1994 | Damm et al. | 384/304 |
| 6,016,288 | A | * | 1/2000 | Frith | 367/85 |
| 6,109,790 | A | * | 8/2000 | von Gynz-Rekowski et al. | 384/97 |
| 6,361,217 | B1 | * | 3/2002 | Beasley | 384/124 |
| 6,416,225 | B1 | * | 7/2002 | Cioceanu et al. | 384/97 |
| 6,827,160 | B2 | * | 12/2004 | Blair et al. | 175/107 |
| 7,028,777 | B2 | * | 4/2006 | Wade et al. | 166/343 |
| 7,040,394 | B2 | * | 5/2006 | Bailey et al. | 166/84.4 |
| 7,306,059 | B2 | * | 12/2007 | Ide | 175/107 |
| 7,500,787 | B2 | * | 3/2009 | Cioceanu | 384/97 |
| 7,635,034 | B2 | * | 12/2009 | Williams et al. | 175/195 |
| 2003/0015352 | A1 | * | 1/2003 | Robin | 175/107 |
| 2005/0241833 | A1 | * | 11/2005 | Bailey et al. | 175/195 |
| 2006/0108119 | A1 | * | 5/2006 | Bailey et al. | 166/341 |
| 2007/0071373 | A1 | * | 3/2007 | Wenzel | 384/97 |
| 2008/0059073 | A1 | * | 3/2008 | Giroux et al. | 175/325.2 |

* cited by examiner

*Primary Examiner* — Marcus Charles
(74) *Attorney, Agent, or Firm* — Davis & Bujold, P.L.L.C.

(57) ABSTRACT

A bearing assembly has an outer housing, and an inner mandrel extending into outer housing. Radial bearing sleeves are positioned between the inner mandrel and the outer housing at both of ends of the outer housing. A thrust bearing assembly is positioned within the interior cavity of the outer housing, and includes a fixed bearing carrier fixed to the inner mandrel, first and second floating bearings carriers, and first and second pressure responsive fillers. Floating bearing carriers support hard face bearings that engage hard face bearings on the fixed bearing carrier to withstand axial loads. Pressure responsive fillers permit the floating bearing carriers limited angular adjustment in relation to the fixed bearing carrier to maintain their respective at least one hard face bearing in face to face relation notwithstanding deflections within required radial bearing tolerance.

13 Claims, 3 Drawing Sheets

BEARING ASSEMBLY FOR USE IN EARTH DRILLING

FIELD

The present invention relates to a bearing assembly suitable for use with a down hole motor when drilling an oil or gas well.

BACKGROUND

It is well known in directional drilling that it is desirable to have a drilling motor assembly that is as short as possible so as to facilitate a relatively short radius from a vertical orientation to a horizontal orientation. A shorter bearing assembly assists in reducing the overall length of the motor assembly.

SUMMARY

There is provided a bearing assembly simplified that can be fabricated with a length of less than three feet. The bearing assembly comprises an outer housing having a first end, a second end and an interior surface that defines an interior cavity. There is an inner mandrel that has an exterior surface. A majority of the inner mandrel extends into the interior cavity of the outer housing. Radial bearing sleeves are positioned between the exterior surface of the inner mandrel and the interior surface of the outer housing at both of the first end and the second end of the outer housing. The radial bearing sleeves facilitate relative axial rotation of the inner mandrel and the outer housing. A thrust bearing assembly is positioned within the interior cavity intermediate the first end and the second end of the outer housing. The thrust bearing assembly comprises a fixed bearing carrier, first and second floating bearing carriers, and first and second pressure responsive fillers. The fixed bearing carrier is fixed to the exterior surface of the inner mandrel. The fixed bearing carrier has a first end and a second end, with at least one hard face bearing positioned at the first end and at least one hard face bearing positioned at the second end. The first floating bearing carrier supports at least one hard face bearing that engages in face to face relation the at least one hard face bearing at the first end of the fixed bearing carrier to withstand off-bottom axial loads. The first pressure responsive filler is disposed between the first floating bearing carrier and a first shoulder formed in the interior surface of the outer housing and permits the first floating bearing carrier limited angular adjustment in relation to the fixed bearing carrier to maintain their respective at least one hard face bearing in face to face relation notwithstanding deflections within required radial bearing tolerances. The second floating bearing carrier supports at least one hard face bearing that engages in face to face relation the at least one hard face bearing at the second end of the fixed bearing carrier positioned at the second end of the fixed bearing carrier to withstand axial loads experienced when drilling. The second pressure responsive filler is disposed between the second floating bearing carrier and a second shoulder formed in the interior surface of the outer housing, and permits the second floating bearing carrier limited angular adjustment in relation to the fixed bearing carrier to maintain their respective at least one hard face bearing in face to face relation notwithstanding deflections within required radial bearing tolerances. A lubricating drilling fluid flow path extends between the radial bearing sleeves at the second end of the outer housing, through the interior cavity between each of the hard face bearings and out between the radial bearing sleeves at the second end of the outer housing.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
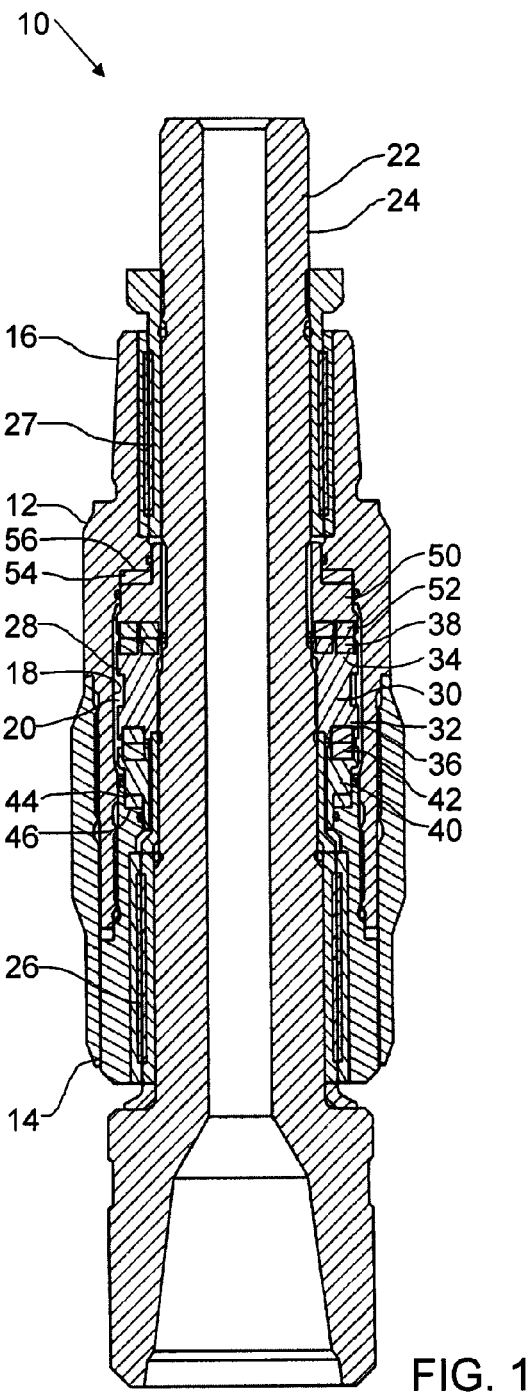
FIG. 1 is a side elevation view in section of a bearing assembly.

A first embodiment of bearing assembly generally identified by reference numeral 10, will now be described with reference to FIGS. 1 and 2. This bearing assembly has a pressure responsive filler in the form of a rubber spring element. Additional embodiments of bearing assembly generally identified by reference numeral 100, will then be described with reference to FIGS. 3, 4 and 5. These bearing assemblies have different a pressure responsive fillers and engagement means. As many of the components are similar between the various embodiments, many components will be given identical reference numerals.

Structure and Relationship of Parts:

Referring to FIG. 1, bearing assembly 10 has an outer housing 12 with a first end 14, a second end 16 and an interior surface 18 that defines an interior cavity 20. There is an inner mandrel 22 that has an exterior surface 24. A majority of inner mandrel 22 extends into interior cavity 20 of outer housing 12. Radial bearing sleeves 26 and 27 are positioned between exterior surface 24 of inner mandrel 22 and interior surface 18 of outer housing 12 at both of first end 14 and second end 16 of outer housing 12. Radial bearing sleeves 26 and 27 facilitate relative axial rotation of inner mandrel 22 and outer housing 12.

A thrust bearing assembly 28 is positioned within interior cavity 20 intermediate first end 14 and second end 16 of outer housing 12. Thrust bearing assembly 28 has a fixed bearing carrier 30 fixed to exterior surface 24 of inner mandrel 22. Fixed bearing carrier 30 has a first end 32 and a second end 34. Hard face bearings 36 and 38 are positioned at first end 32 and at the second end 34 of fixed bearing carrier 30. As depicted, there is one row of hard face bearings 36 at first end 32, and two rows of hard face bearings 38 at second end 34.

A first floating bearing carrier 40 supports a hard face bearing 42 that engages in face to face relation hard face bearing 36 at first end 32 of fixed bearing carrier 30. First floating bearing carrier 40 is used to withstand off-bottom axial loads. A first pressure responsive filler 44 made from rubber is disposed between first floating bearing carrier 40 and a first shoulder 46 formed in interior surface 18 of outer housing 12 that permits first floating bearing carrier 40 limited angular adjustment in relation to fixed bearing carrier 30 to maintain their respective hard face bearings 36 and 42 in face to face relation notwithstanding deflections within required radial bearing tolerances.

A second floating bearing carrier 50 supports two hard face bearings 52 as shown that engages in face to face relation hard face bearings 38 at second end 34 of fixed bearing carrier 30. Second floating bearing carrier 50 is positioned at second end 34 of fixed bearing carrier 30 to withstand axial loads experienced when drilling. A second pressure responsive filler 54 such as a rubber spring element is disposed between second floating bearing carrier 50 and a second shoulder 56 formed in interior surface 18 of outer housing 12 that permits second floating bearing carrier 50 limited angular adjustment in relation to fixed bearing carrier 30 to maintain their respective hard face bearings 38 and 52 in face to face relation notwithstanding deflections within required radial bearing tolerances.

Figure 2:
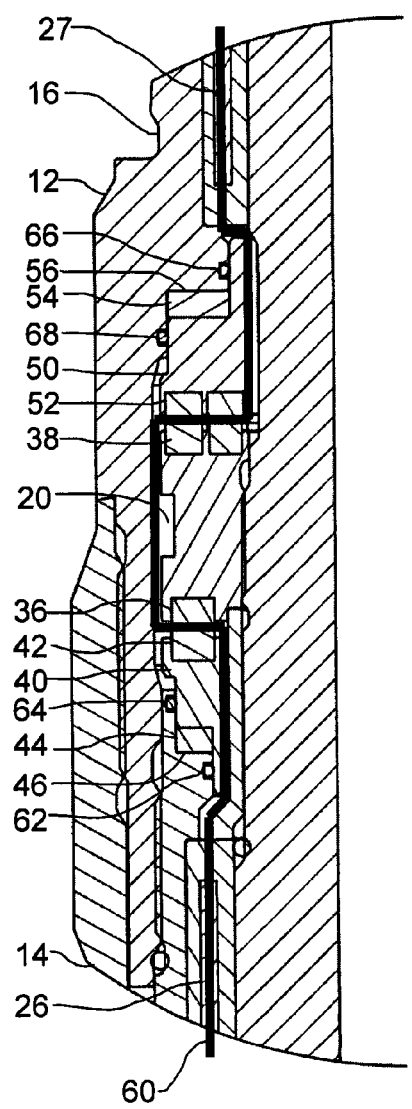
FIG. 2 is a detailed side elevation view in section of the bearing assembly of FIG. 1.

Referring to FIG. 2, a lubricating drilling fluid flow through path 60 extends between radial bearing sleeves 27 at second end 16 of outer housing 12, through interior cavity 20 between hard face bearings 38 and 52, and between hard face bearings 36 and 42 and out between the radial bearing sleeves 26 at first end 14 of the outer housing 12.

Figure 3:
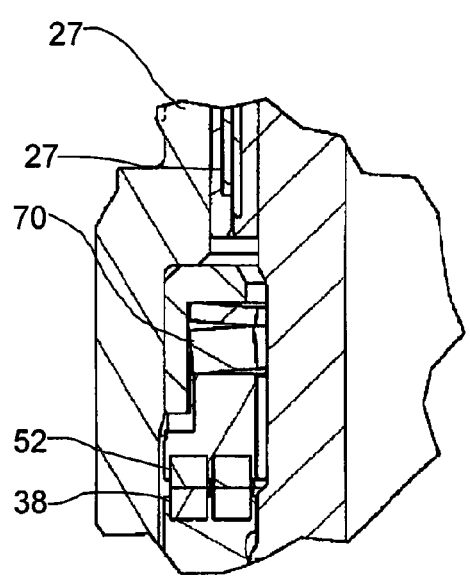
FIG. 3 is a detailed side elevation view in section of an alternative embodiment of the bearing assembly of FIG. 1.
Figure 6:
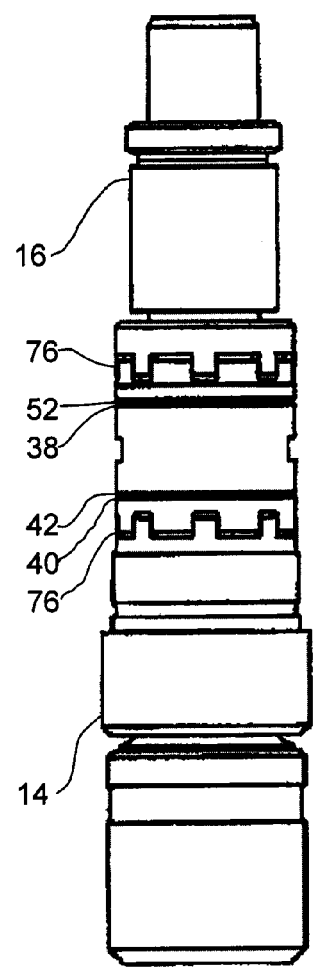
FIG. 6 is a side elevation view of a further alternative embodiment of the bearing assembly of FIG. 1, with the outer housing removed to show a dog clutch engagement.

Referring to FIG. 3, second embodiment bearing assembly 100 is shown, where the pressure responsive fillers are Belleville springs 70. Preferably, a dog clutch arrangement 76 as shown in FIG. 6 is used as the anti-rotation device in this embodiment.

Operation:

Referring to FIG. 1, bearing assembly 10 is assembled with inner mandrel 22 in interior cavity 20 of outer housing 12 with radial bearing sleeves 26 and 27 and thrust bearing assembly 28 as described above.

Bearing assembly 10 is then installed in a downhole assembly, such as a drilling motor. During use, inner mandrel 22 rotates relative to outer housing 12 using radial bearing sleeves 26 and 27 for radial support, such that hard face bearings 36 and 38 move along hard face bearings 42 and 52, respectively. When the drill bit is lifted from the bottom of the well bore, axial loads are applied from the direction of second end 16 of outer housing 12, rubber elements 44 deform and allows a deflection within the required radial bearing tolerances. This deflection allows floating bearing carrier 40 to align with fixed bearing carrier 30. Rubber spring element 44 is resilient, and once the off-bottom axial load is removed, it returns to its original state. Rubber spring element 44 is positioned at first end 14 of outer housing 12 between shoulder 46 and floating bearing carrier 40, allowing hard surfaces 42 and 36 to remain in contact during deflection.

As axial loads during drilling are applied from the direction of second end 16 of outer housing 12, rubber spring element 54 deforms and allows a deflection within the required radial bearing tolerances. Rubber spring element 54 is resilient and once the axial load is removed, it returns to its original state. Rubber spring element 44 is positioned at second end 16 of outer housing 12 between shoulder 56 and floating bearing carrier 50 allowing hard bearing surfaces 52 and 38 to remain in contact during compression loading.

Referring to FIG. 2, during use, downhole fluids flow along fluid flow path 60 as described above to cool and lubricate the components. O-ring seals 62 through 66 seal spring elements 44 and 54 from the fluids, causing spring elements 44 and 54 to be compressed from the hydrostatic pressure in the well bore and thus act as a clutch arrangement to keep floating bearing carriers 40 and 50 stationary with respect to outer housing 12.

Variations:

Two embodiments of bearing assembly have been described above. The purpose of the two embodiments is to describe two different forms of pressure responsive fillers. The first embodiment 10 discloses the use of rubber spring elements 44 and 54 as a pressure responsive filler. The second embodiment 100 discloses the use of Belleville springs 70 and 72 as a pressure responsive filler. It will be apparent to one skilled in the art that, subject to the cautionary warnings set forth below, there are other pressure response fillers that would also be suitable.

In operation, fixed bearing carrier 30 will rotate with inner mandrel 22 and floating bearing carriers 40 and 50 are fixed to outer housing 12. In most applications, friction inherent in assembly 10 or 100 will prevent movement of floating bearing carriers 40 and 50 relative to outer housing 12. However, in those applications where it is questionable whether there is sufficient friction, an anti-rotation device can be used to prevent relative rotation of the floating bearing carriers and the outer housing.

Use of Rubber Spring Element with Seals

Referring to FIG. 2, first and second pressure responsive fillers 44 and 54 are rubber spring elements. "O" ring seals 62, 64 and 66, 68 are provided between first and second floating bearing carriers 40 and 50 and interior surface 18 of outer housing 12 to exclude wellbore fluids from rubber spring elements 44 and 54. "O" ring seals 62, 64, 66 and 68 effectively isolate rubber spring elements 44 and 54 from flow path 60 to increase rotational friction between floating bearing carriers 40 and 50 and the respective shoulders 46 and 56. For example, at a well depth of 6000 feet, with 10 pounds per gallon drilling fluid, the hydrostatic pressure would be approximately 3000 pounds per square inch. The rubber spring elements would be under 3000 pounds per square inch compression, greatly increasing friction.

Use of Rubber Spring Element with Anti-rotation Pins

Figure 4:
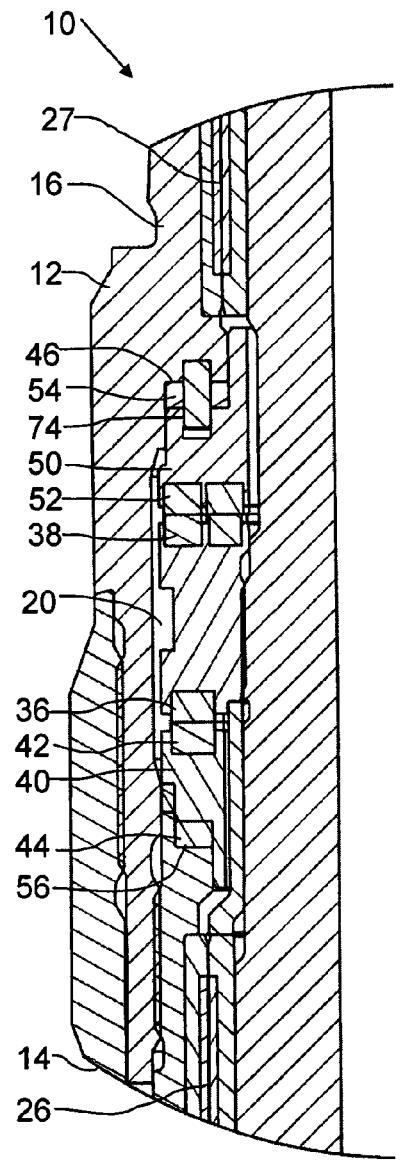
FIG. 4 is a detailed side elevation view in section of a further alternative embodiment of the bearing assembly of FIG. 1.

Referring to FIG. 4, the anti-rotation device may be pins 74 that extend into openings in both second floating bearing carrier 50 and shoulder 56, respectively. Pins 74 are only shown in relation to second floating bearing carrier 50, although it will be understood that they may also be used in relation to first floating bearing carrier 40. Preferably, the holes in floating bearing carrier 50 into which pins 74 are inserted are slightly longer than pins 74, such that as rubber spring element 54 is compressed, pins 74 do not hinder the deflection from occurring.

Use of Belleville Spring with Pins

Figure 5:
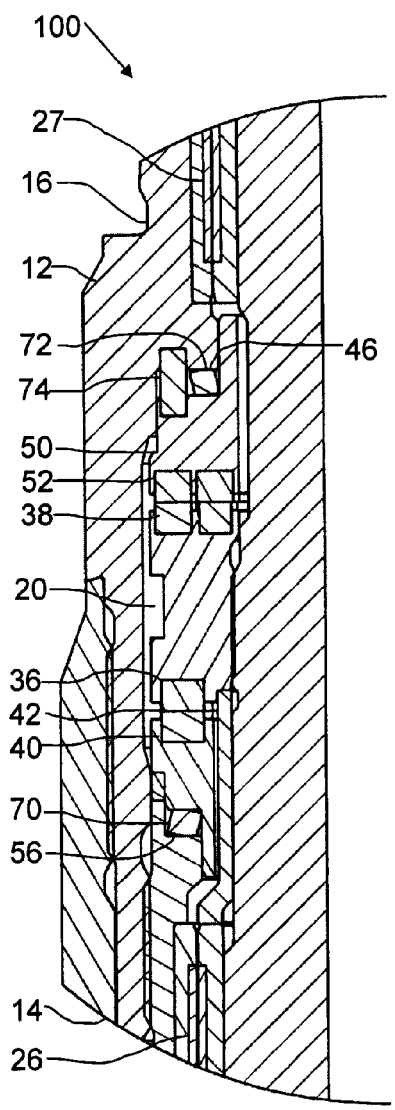
FIG. 5 is a detailed side elevation view in section of a further alternative embodiment of the bearing assembly of FIG. 1.

Referring to FIG. 5, pins 74 may also be used with Belleville springs 70. As shown, pins 74 are positioned to the side of springs 70.

Use of Clutch Profile

Referring to FIG. 6, the anti-rotation device may be a clutch profile 76. This may be used with various pressure responsive fillers, such as those described above.

Cautionary Warnings:

Hard face bearings will last if they are in face to face engagement. However, when they are out of precise face to face alignment, chipping of the hard surfaces may occur. The above embodiments provide floating bearing carriers, that will adjust to maintain the hard face bearings in face to face alignment. Hard face bearings have abrasive resistant surfaces that can rub against each other with relatively little wear, but which may shatter when brought together violently. The pressure responsive fillers are used to absorb shock loading when the loading changes from extension to compression.

This is a mud lubricated bearing. There must be a leakage of drilling fluid through the tool between the radial sleeve bearings and between faces of the hard face bearings to keep them cooled and lubricated.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A bearing assembly comprising:
    an outer housing having a first end, a second end and an interior surface that defines an interior cavity;
    an inner mandrel having an exterior surface, and a majority of the inner mandrel extending into the interior cavity of the outer housing;
    radial bearing sleeves positioned between the exterior surface of the inner mandrel and the interior surface of the outer housing at both of the first end and the second end of the outer housing, and the radial bearing sleeves facilitating relative axial rotation of the inner mandrel and the outer housing;
    a thrust bearing assembly positioned within the interior cavity intermediate the first end and the second end of the outer housing, and the thrust bearing assembly comprising:
        a fixed bearing carrier fixed to the exterior surface of the inner mandrel, the fixed bearing carrier having a first end and a second end, with at least one first hard face bearing positioned at the first end and at least one second hard face bearing positioned at the second end;
        a first floating bearing carrier supporting at least one third hard face bearing that engages, in face to face, relation the at least one first hard face bearing at the first end of the fixed bearing carrier to withstand off-bottom axial loads;
        a first pressure responsive filler disposed between the first floating bearing carrier and a first shoulder formed in the interior surface of the outer housing, that permits the first floating bearing carrier limited angular adjustment in relation to the fixed bearing carrier to maintain the at least one first hard face bearing and the at least one third hard face bearing in face to face relation notwithstanding deflections within required radial bearing tolerances;
        a second floating bearing carrier supporting at least one fourth hard face bearing that engages, in face to face relation, the at least one second hard face bearing at the second end of the fixed bearing carrier positioned at the second end of the fixed bearing carrier to withstand axial loads experienced when drilling;
        a second pressure responsive filler disposed between the second floating bearing carrier and a second shoulder formed in the interior surface of the outer housing that permits the second floating bearing carrier limited angular adjustment in relation to the fixed bearing carrier to maintain the at least one second hard face bearing and the at least one fourth hard face bearing in face to face relation notwithstanding deflections within required radial bearing tolerances; and
        a lubricating drilling fluid flow path extending between the radial bearing sleeves at the first end of the outer housing to the radial bearing sleeves at the second end of the outer housing, and the fluid flow path traversing the at least one first and third hard face bearings, the interior cavity and the at least one second and fourth hard face bearings.

2. The bearing assembly of claim 1, wherein the first pressure responsive filler is rubber.

3. The bearing assembly of claim 2, wherein the rubber is a rubber spring element and "O" ring seals are provided between the first floating bearing carrier and the interior surface of the outer housing to exclude wellbore fluids from the rubber spring element, whereby the rubber spring element increases rotational friction between the first floating bearing carrier and the first shoulder.

4. The bearing assembly of claim 1, wherein the first pressure responsive filler is a Belleville spring.

5. The bearing assembly of claim 1, wherein the second pressure responsive filler is rubber.

6. The bearing assembly of claim 5, wherein the rubber is a rubber spring element and "O" ring seals are provided between the second floating bearing carrier and the interior surface of the outer housing to exclude wellbore fluids from the rubber spring element, whereby the rubber spring element increases rotational friction between the second floating bearing carrier and the second shoulder.

7. The bearing assembly of claim 1, wherein the second pressure responsive filler is a Belleville spring.

8. The bearing assembly of claim 1, wherein an anti-rotation device is provided to prevent rotation of the first floating bearing carrier relative to the outer housing.

9. The bearing assembly of claim 8, wherein the anti-rotation device is a clutch engagement between first floating bearing carrier and the first shoulder.

10. The bearing assembly of claim 8, wherein the anti-rotation device are pins that extend into openings in both the first floating bearing carrier and the first shoulder.

11. The bearing assembly of claim 1, wherein an anti-rotation device is provided to prevent rotation of the second floating bearing carrier relative to the outer housing.

12. The bearing assembly of claim 11, wherein the anti-rotation device is a clutch engagement between second floating bearing carrier and the second shoulder.

13. The bearing assembly of claim 11, wherein the anti-rotation device are pins that extend into openings in both the second floating bearing carrier and the second shoulder.

* * * * *